US009448949B2

United States Patent
Cousins et al.

(10) Patent No.: US 9,448,949 B2
(45) Date of Patent: *Sep. 20, 2016

(54) MOBILE DATA VAULT (71) Applicant: CommandHub, Inc., Leesburg, VA (US)

(72) Inventors: Richard Cousins, Washington, DC (US); Linton Henderson, Melbourne (AU); Graham Matthews, Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 14/831,029

(22) Filed: Aug. 20, 2015

(65) Prior Publication Data

US 2015/0356311 A1 Dec. 10, 2015

Related U.S. Application Data (60) Division of application No. 13/486,360, filed on Jun. 1, 2012, now Pat. No. 9,146,881, which is a continuation-in-part of application No. 61/493,187, filed on Jun. 3, 2011.

(51) Int. Cl.
*G06F 12/14* (2006.01)
*H04L 9/32* (2006.01)
*H04L 9/08* (2006.01)
*G06F 21/62* (2013.01)

(52) U.S. Cl.
CPC ....... *G06F 12/1408* (2013.01); *G06F 21/6209* (2013.01); *H04L 9/0822* (2013.01); *H04L 9/0866* (2013.01); *H04L 9/0869* (2013.01); *H04L 9/3226* (2013.01); *G06F 2221/2107* (2013.01)

(58) Field of Classification Search
CPC ........................... H04L 9/3226; H04L 9/0822
See application file for complete search history.

(56) References Cited

U.S. PATENT DOCUMENTS

| | | | | |
|---|---|---|---|---|
| 5,787,169 A * | 7/1998 | Eldridge | ................. | G06F 21/40 380/286 |
| 6,023,506 A * | 2/2000 | Ote | ..................... | G06F 21/6209 380/45 |
| 6,081,893 A * | 6/2000 | Grawrock | ............... | G06F 21/31 380/282 |
| 6,360,322 B1* | 3/2002 | Grawrock | ............... | G06F 21/31 380/255 |
| 6,947,556 B1* | 9/2005 | Matyas, Jr. | ......... | G06F 21/6209 380/281 |
| 7,010,689 B1* | 3/2006 | Matyas, Jr. | ........... | H04L 9/3073 713/160 |
| 7,055,042 B1* | 5/2006 | Gough | ..................... | G06F 21/31 726/19 |
| 7,529,374 B2* | 5/2009 | Huttunen | ............ | G06F 21/6209 380/277 |
| 7,565,702 B2* | 7/2009 | Jakubowski | ........ | G06F 21/6209 380/277 |
| 7,743,069 B2* | 6/2010 | Chitkara | ........... | G06F 17/30595 707/781 |
| 7,917,963 B2* | 3/2011 | Goyal | ................. | G06F 21/6209 726/29 |
| 7,925,023 B2* | 4/2011 | Youn | ...................... | H04L 9/083 380/277 |

(Continued)

*Primary Examiner* — James Turchen
(74) *Attorney, Agent, or Firm* — Husch Blackwell LLP (57) ABSTRACT

A portable electronic device is provided. The portable electronic device includes a data interface module that processes files associated with a user, the data interface module receives and validates a password from a user of the portable electronic device before the user is allowed access to files processed by the data interface module, an encryption key formed by the data interface module upon validation of the password, the encryption key further comprising the password, a hard coded private string and a serial number of the portable electronic device and a data storage area that stores files received from the data interface module the stored files are encrypted using the encryption key and where neither the encryption key or the password are stored in an unencrypted format anyplace within the portable electronic device.

17 Claims, 5 Drawing Sheets

(56) References Cited

U.S. PATENT DOCUMENTS

| | | | | |
|---|---|---|---|---|
| 8,041,677 B2* | 10/2011 | Sumner | G06F 11/1453 | 707/640 |
| 8,161,527 B2* | 4/2012 | Curren | G06F 21/6227 | 713/164 |
| 8,171,527 B2* | 5/2012 | Qiu | H04L 9/3226 | 380/247 |
| 8,239,691 B2* | 8/2012 | Watanabe | G06F 21/80 | 713/182 |
| 8,248,237 B2* | 8/2012 | Fitzgerald | G06F 21/88 | 340/457 |
| 8,416,954 B1* | 4/2013 | Raizen | H04L 63/0428 | 380/277 |
| 8,418,258 B2* | 4/2013 | Goyal | G06F 21/6209 | 709/217 |
| 2005/0222933 A1* | 10/2005 | Wesby | G06Q 40/00 | 705/36 R |
| 2007/0143632 A1* | 6/2007 | Matsuzaki | G06F 21/6218 | 713/193 |
| 2007/0156726 A1* | 7/2007 | Levy | G06F 17/3002 | |
| 2007/0255963 A1* | 11/2007 | Pizano | G06F 21/32 | 713/189 |
| 2010/0138298 A1* | 6/2010 | Fitzgerald | G06F 21/88 | 705/14.53 |
| 2011/0126024 A1* | 5/2011 | Beatson | G06F 21/32 | 713/186 |
| 2011/0302649 A1* | 12/2011 | Foster | G06F 21/36 | 726/19 |
| 2012/0047563 A1* | 2/2012 | Wheeler | G06F 21/335 | 726/6 |
| 2012/0124388 A1* | 5/2012 | Chng | G06Q 30/06 | 713/189 |
| 2012/0246472 A1* | 9/2012 | Berengoltz | G06F 11/1448 | 713/165 |

* cited by examiner

MOBILE DATA VAULT

RELATED APPLICATIONS

This Application is a divisional of U.S. patent application Ser. No. 13/486,360 filed on Jun. 1, 2012 (pending) which is a continuation-in-part of U.S. Provisional Patent Application No. 61/493,187 filed on Jun. 3, 2011 which is hereby incorporated as if fully set forth herein.

FIELD

The field of the invention relates to mobile wireless devices and more particularly to the protection of data stored on such devices.

BACKGROUND

Mobile electronic devices such as the Apple iPad or iPhone and similar Android-based devices are generally known. The manufacturers of such devices have provided for security of information within such devices including encrypting of the materials within the file system and a means of locally or remotely resetting the device to its factory settings. However, these means for protecting sensitive information are generally inadequate.

In general, all files stored on the iPad's file system are AES hardware encrypted. iOS decrypts the files at access-time, using a key stored on the device. Even with a device password, unless the app uses the Data Protection API, the files on the device are not secured. The positive side of the full disk encryption is that once the keys are removed (e.g. by doing a remote wipe), the data is virtually unrecoverable.

Applications which use the Apple Data Protection rely on the device's hardware encryption to encrypt the application data. Even though this is an improvement on previous Apple security implementations, there are several limitations to this approach. First, it relies on the user's device passcode which may be very weak (default is a 4 digit pin), and can therefore be brute forced relatively easily and second, the "Escrow Keybag" weakness means that if a user's computer is obtained along with the mobile device, it will be much easier to decrypt the user's protected data. Accordingly, a need exists for better security on such devices.

DETAILED DESCRIPTION OF AN ILLUSTRATED EMBODIMENT

Figure 1:
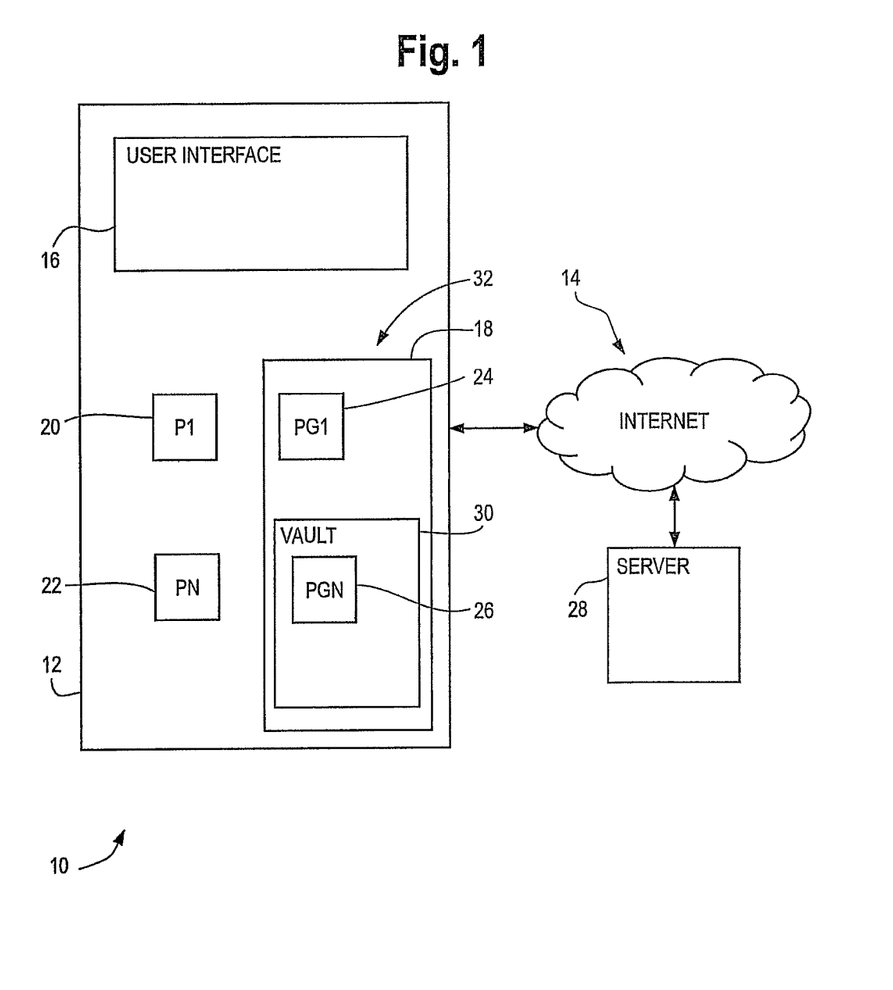
FIG. 1 is a block diagram of a communication system in accordance with an illustrated embodiment.

FIG. 1 is a block diagram of a communication system 10 shown generally in accordance with an illustrated embodiment. The communication system 10 may include: 1) a portable communication device 12; 2) a network 14; 3) a user interface 16 to the device 12; 4) a non-transitory persistent memory (e.g., a disk) 18 of the device 12; 5) hardware processors (e.g., Intel processors) 20, 22; 6) software programs 24 of the device 12; 7) a data Vault system 30; 7) a software program 26 of the Vault 30; 8) server 28 and 9) an operating system 30 of the device 12.

Included within the system 10 is a portable communication device 12 that may wirelessly communicate with and exchange infatuation over a network (e.g., the Internet) 14. The portable communication device 12 may be any of a number of commercially available portable devices (e.g., iPad, iPhone, any of a number of different Android devices, etc.)

In this regard, the functionality of the user device 12 (as viewed through the user interface 16) is provided by one or more hardware processors 20, 22 operating under control of one or more software programs (applications) 24 loaded from a non-transitory computer readable medium (memory) 18. It should be specifically noted in this regard, that any reference herein to the functionality of a program or any portion of a program is also a reference to the hardware processor 20, 22 that provides the functionality of that program to the user.

Included within the portable device 12 is a data security system referred to herein a CommandHub Mobile Vault 30 that operates completely independently of the operating system 32 of the portable device 12. In effect, the Mobile Vault 30 comprises an application 26 that executes on the processors 20, 22.

It should be noted in this regard that many devices (such as portable device 12) are designed to operate under the "sandbox approach." The sandbox approach means that applications added to the device can only communicate with applications originally provided with the device 12 through memory (i.e. the disk). More specifically, the Vault 30 is a sibling to other applications like a browser or email, but does not communicate directly with such applications.

Figure 2:
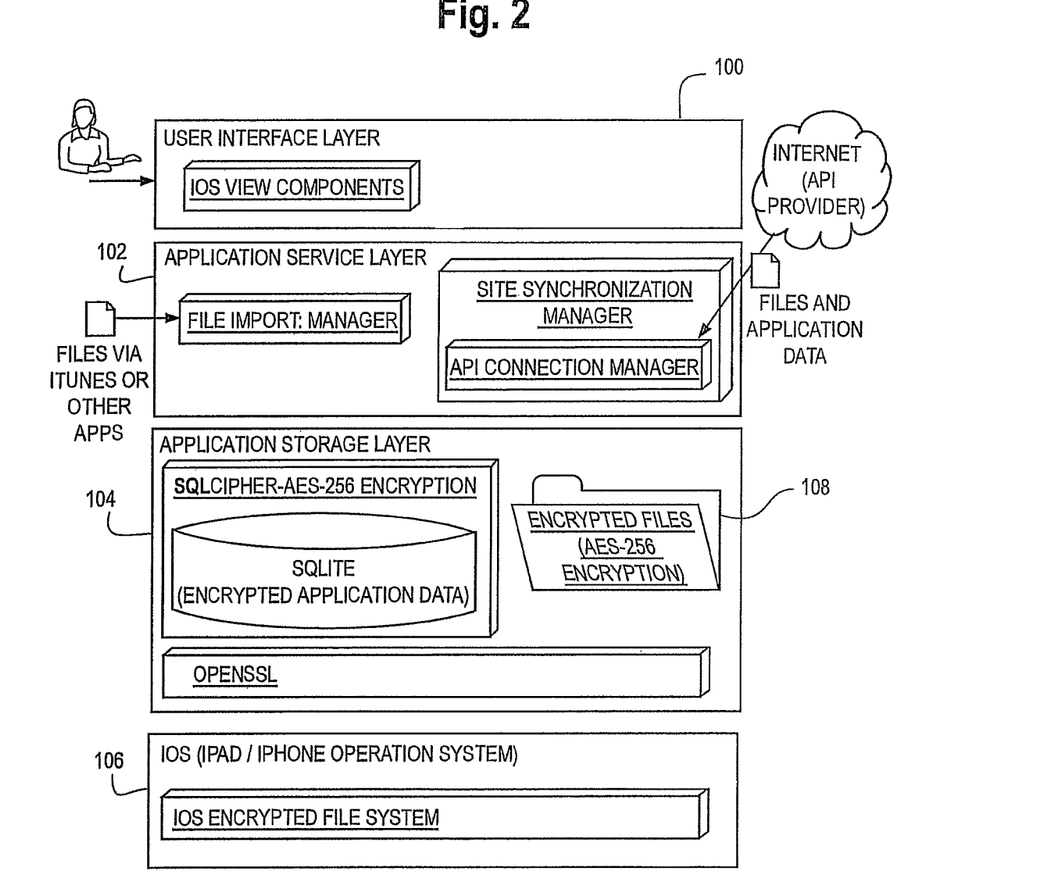
FIG. 2 depicts an application layering structure that may be used within the system of FIG. 1.

Beginning with an overview, the Vault 30 is an iOS application (app) shown in general in FIG. 2 which runs on an iPad, iPhone or similar device. The vault 30 consists of: a user interface 100 built from standard iOS UI components; a service layer 102 responsible for managing data and files and a storage layer 104 responsible for persisting application data and files using SQLCipher and encrypted files. In this regard, encryption within the application storage layer 104 may be accomplished via an encryption processor using the AES-256 algorithm from the OpenSSL library. The encrypted database and files of the system 30 are stored within the persistent memory 18 of the iOS operating system (shown as 106 in FIG. 2).

In general, a user interacts with one or more interface components of the user interface 100, to view and manipulate data and documents. Files and data can be added to the Vault 30 using various means, including iTunes file sharing, opening files from other apps 26 on the device 12, synchronizing with an external server 28 via the network 14.

To use the Vault 30, the user is first prompted by a password processor of the Vault 30 to create a new strong password which only applies to the Vault 30 and applications 26. Password strength is enforced via a number of different methodologies (under one preferred embodiment a password must be at least 8 characters long and consist of at least 2 alpha characters plus 2 non-alpha characters). This password is not stored anywhere on the device 12 and is used to encrypt all Vault data before it is written to the device disk. Instead of relying on the built-in device hardware encryption of the device 12, the Vault 30 utilizes software encryption within the encryption processor of the Vault 30 based on SQLCipher and OpenSSL to store all application data.

Figure 3:
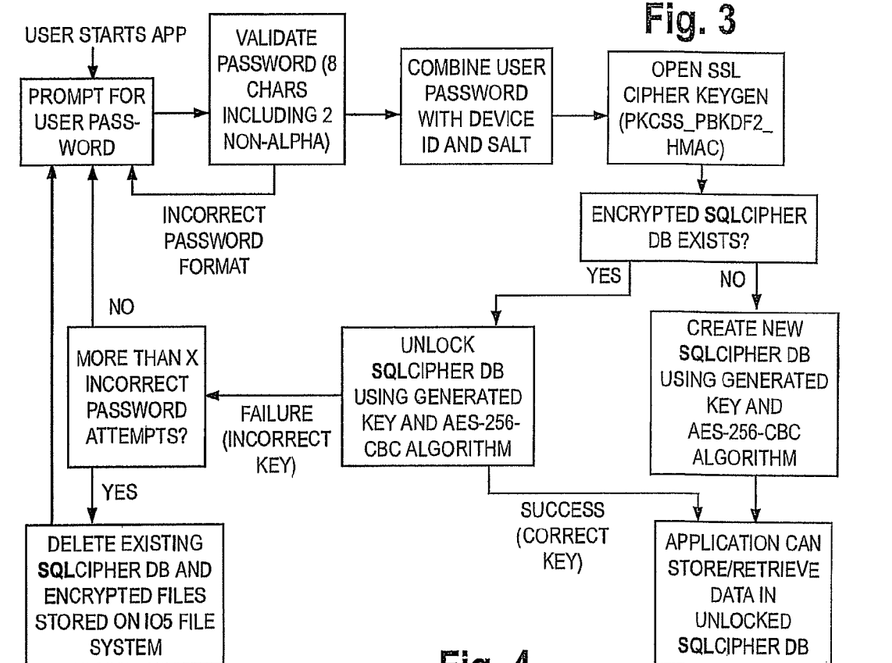
FIG. 3 depicts infatuation processing modules of FIG. 1 and the flow of infatuation used to protect sensitive information.

FIG. 3 is a simplified flow of information flow among processing modules 26 of the system 30. FIG. 3 shows: 1) the process of obtaining the password from the user; 2) combining the user password with other elements to form the SQLCipher key; 3) creating the SQLCipher database using the SQLCipher key; 4) unlocking the existing SQLCipher database using the SQLCipher key and 5) deletion of data and files after X number of invalid password attempts. It should be specifically noted that under one illustrated embodiment, the Vault 30 keeps track of the number of attempts to unlock the database of the Vault 30. If the number of attempts is greater than some number, a tracking module or processor of the Vault 30 automatically deletes the database and related files of The Vault 30.

Under another illustrated embodiment, an encryption key processor of the Vault 30 creates the encryption key by first combining identification elements including the user password, an identifier (e.g., electronic serial number (ESN)) of the device 12 and a hard coded private string (a fixed passphrase salt). In this regard, the ESN may be a 40 character hex string. In contrast, a fixed passphrase salt is a fixed-length constant string.

The combined user password, ID of the device and salt may then be processed in a hash-based message authentication code (HMAC) processor to generate the encryption key. In this case, the combined identification elements are processed iteratively for some predetermined number (e.g., several hundred to several thousand) of cycles to achieve a sufficiently complex encryption key.

The HMAC processor may use any of a number of different hashing functions for generating the encryption key. Under one illustrated embodiment, the hashing function used for this purpose may be public domain software downloaded from the Open SSL library and identified by the name "PKCS5_PBKDF2_HMAC( )" and which uses digest routine "sha256."

The encryption key generated allows the SQLCipher database (DB) 108 to be unlocked (i.e., decoded). Once the SQLCipher database is successfully unlocked, data can be stored and retrieved using standard SQL statements using a search processor of the Vault 30. Once opened, access to the database is kept open until the vault application 26 is closed or suspended.

Figure 4:
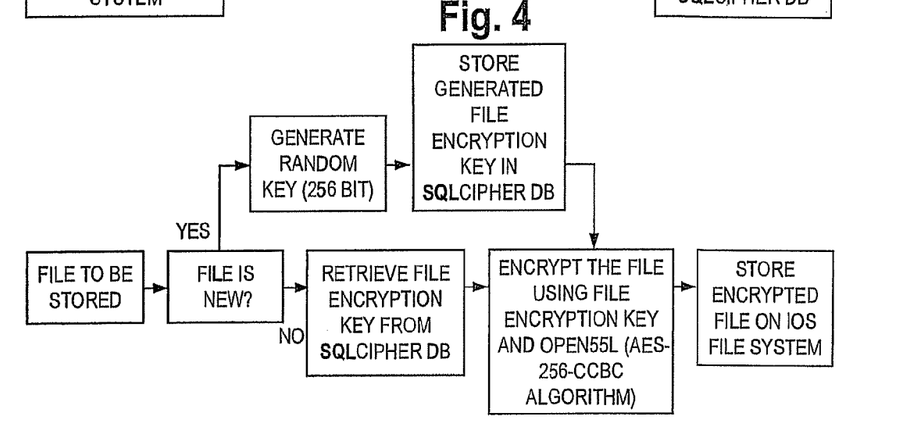
FIG. 4 depicts information processing modules of FIG. 1 and the flow of information used to save sensitive information.

The vault stores application data within the encrypted SQLCipher database as shown in FIG. 2 (104) and in FIG. 4. Files (BLOBs) are stored outside of the SQLCipher database 108, however the file binary data of a BLOB is encrypted using the OpenSSL library (AES-256 algorithm) prior to being written to the file system 18. The random encryption keys that are used to encrypt the files are generated by the Vault application 26 and stored within the SQLCipher database. The diagram of FIG. 4 shows the process of adding a file to the Vault 30 including the generation of the random encryption key.

It should be specifically noted that the encryption key of a BLOB is different than the encryption key based upon the password of the user. The encryption key based upon the password of the user is never stored within the device 12. It is deleted immediately after use (as is the password).

For purposes of clarity, a BLOB is a file containing the binary data of a single stored document file. Only parts of the information from the site that are visible to the user are sent to the processing application that creates the SQLCipher database and BLOBs. The user name and password to each site may be stored within the SQLCipher database.

A BLOB file may be stored external to the database 108 of the Vault 30 This improves the performance of the Vault 30 when dealing with large files within the database 108.

Figure 6:
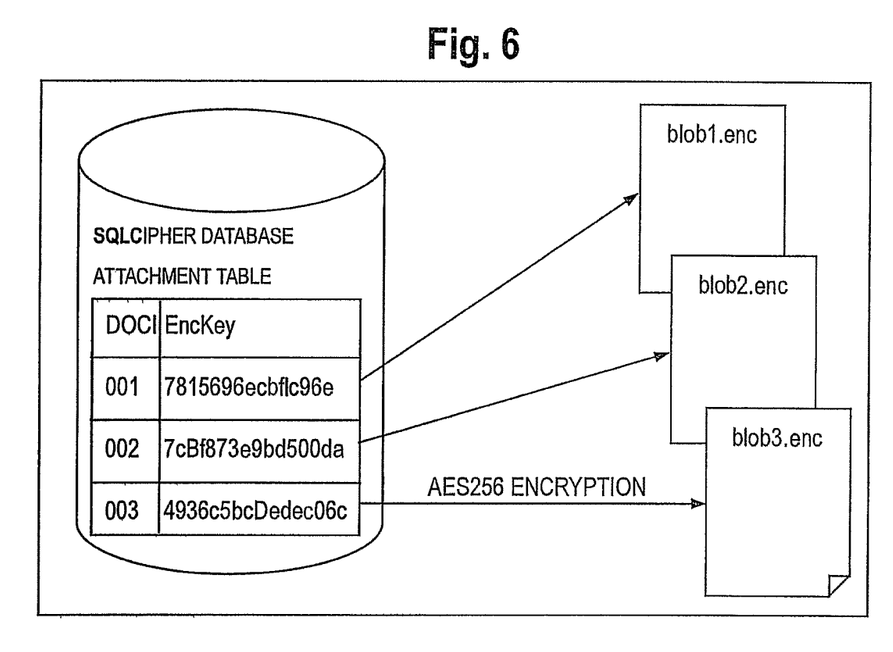
FIG. 6 depicts a simplified view of the encrypted information of FIG. 2.

FIG. 6 depicts the relationship between the database of the Vault 30 and the BLOB files regarding retrieval of the encryption key for the BLOB files. In this regard, unlocking of the database 108 of the Vault 30 allows the encryption key for each of the BLOB files to be retrieved. This allows the snapshot information of each of the respective data files within the database 108 to be more quickly retrieved.

Figure 5:
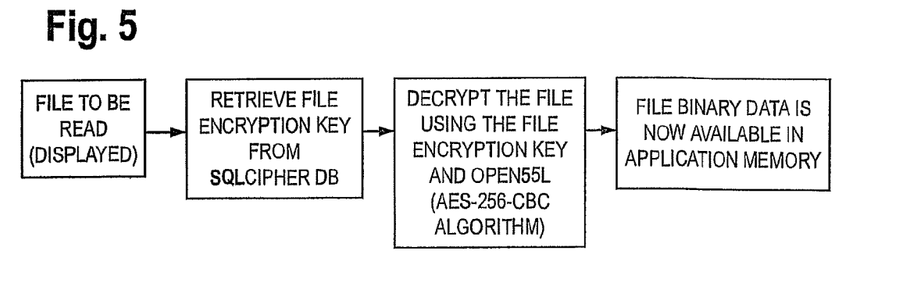
FIG. 5 depicts information processing modules of FIG. 1 and the further flow of information for the retrieval of sensitive information.

FIG. 5 shows the process of reading an encrypted file form the Vault 30. When a file is to be read from the Vault 30 (for display to the user for instance), the inverse process is followed. The encryption key for the file is read from the SQLCipher database and is used to decrypt the file binary data when read from disk so the unencrypted file binary data is available in memory.

Together, FIGS. 4 and 5 show how a file can be added to the vault, stored on the file system using AES-256 encryption, then later read back from disk, unencrypted and displayed to the user.

In this regard the Mobile Vault 30 acts like any other memory device during use of the device 12 except that a user must first activate the Vault 30 by entry of the password. Once the password is entered and accepted, the user may save data files into the Vault 30 and retrieve files in a simple and straightforward manner.

It should be noted in this regard, that the database of the Vault 30 cannot be opened without the correct password. Without entry and acceptance of the proper password (and opening of the database of the Vault 30), the encryption key of the stored BLOB files cannot be retrieved.

Figure 7:
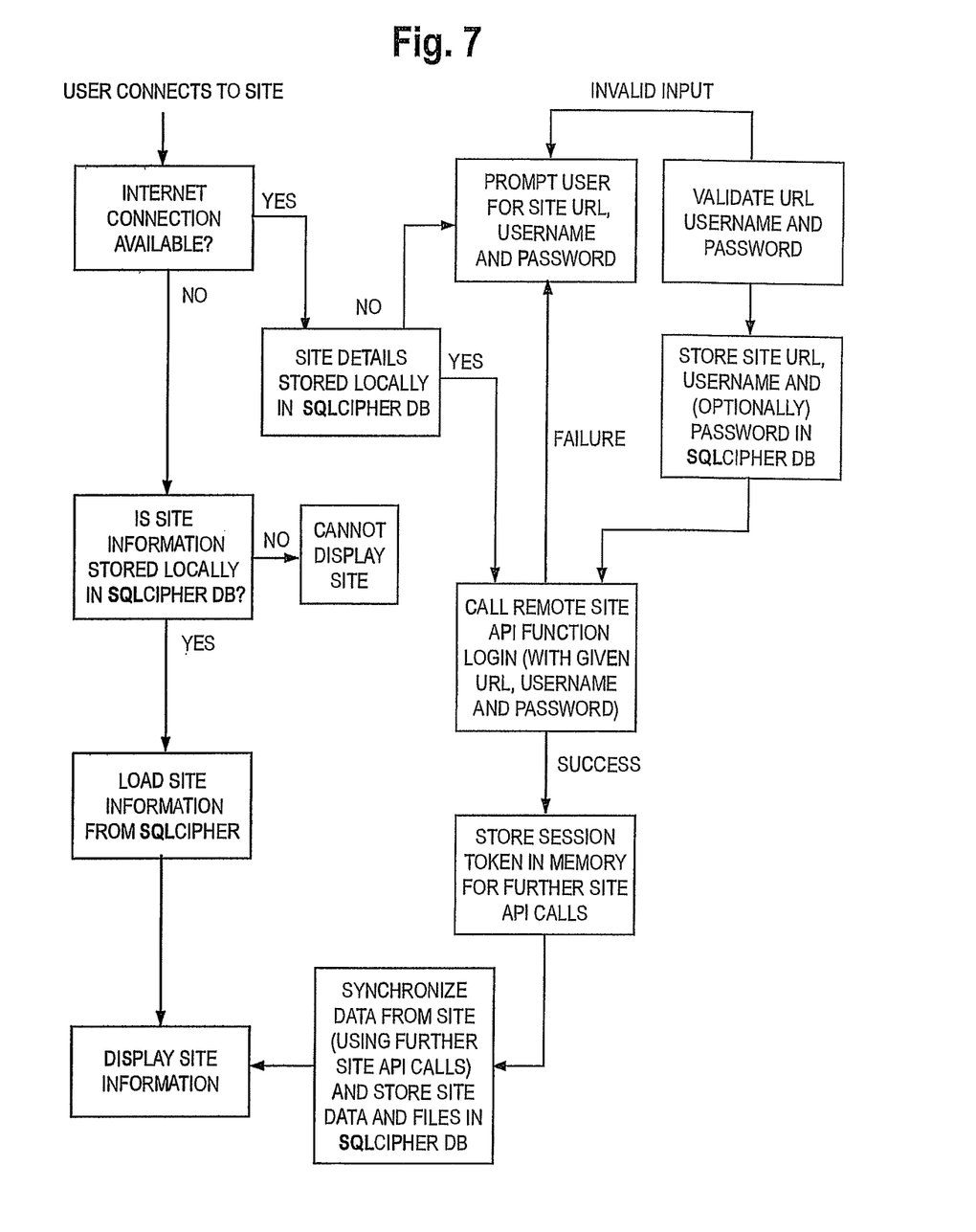
FIG. 7 depicts infatuation processing modules of FIG. 1 and the flow of information used for receiving sensitive information from remote sites.

Communication with the remote server will be discussed next as shown in FIG. 7. In this regard, data and files can be added to the vault environment in several ways. One specific instance is via communication with a remote server 28 over a network connection 14 using a predefined web API. FIG. 7 explains the process of a user authenticating with the remote server 28 and synchronizing data and files from that server.

For example, under one illustrated embodiment, a user of the device 12 may configure the Vault 30 to connect to a remote server 28 and download data and files from that server 28.

In this case, if the details of the remote site 28 are not stored locally in the SQLCipher DB, the user may be prompted for the URL of the remote server 28, the username and the password.

Once the details of remote server are stored locally in the SQLCipher DB, the Vault 30 may call a remote server API function to login to the remote server 28. ON successful login, to the remote server 28, the Vault 30 will download and store a session token in memory for further server API calls. A synchronization processor of the Vault 30 may synchronize data and files from the remote server 28 (using further API calls) and store the data and files from the server 28 in the SQLCipher DB and encrypted file store. The user of the device 12 may then display the information from the server 28 on the UI 16 of the device.

In the case where no accessible network 14 is available, the user may log into the Vault 30 and view previously downloaded data and files.

In general, the portable electronic device includes a data interface module that processes files associated with a user, the data interface module receives and validates a password from a user of the portable electronic device before the user is allowed access to files processed by the data interface module, an encryption key formed by the data interface module upon validation of the password, the encryption key further comprising the password, a hard coded private string and a serial number of the portable electronic device and a data storage area that stores files received from the data interface module the stored files are encrypted using the encryption key and where neither the encryption key or the password are stored in an unencrypted format anyplace within the portable electronic device.

In other embodiments, the electronic device includes a user interface module that processes files associated with a user, the data interface module receives and validates a password from the user of the portable electronic device before the user is allowed access to files processed by the data interface module, an encryption key processor that forms an encryption key upon validation of the password, the encryption key further comprising the password, a hard coded private string and a serial number of the portable electronic device and a data storage area that stores files received from the data interface module the stored files are encrypted using the encryption key and where neither the encryption key or the password are stored in an unencrypted format anyplace within the portable electronic device.

In general, the portable electronic device includes a computer program with a non-transitory computer readable medium of the portable electronic device, the computer readable medium executing on a processor of the portable device to perform a set of steps of validating a password from the user of the portable electronic device, forming an encryption key upon validation of the password, the encryption key further comprising the password, a hard coded private string and a serial number of the portable electronic device and unlocking a data storage area using the encryption key, the data storage area stores files exchanged with the remote server through the data interface module, the stored files are encrypted using the encryption key and where neither the encryption key or the password are stored in an unencrypted format anyplace within the portable electronic device.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. An electronic device comprising:
   a hardware processor;
   a memory;
   an encrypted data structure area associated with a user that contains individual file encryption keys;
   a file storage area that stores files associated with a user, each file encrypted using a unique random encryption key that is stored in the encrypted data structure area;
   a user interface module that receives a password from a user of the electronic device and derives from the user-provided password, a serial number of the electronic device and a hard coded private string, an encryption key to the data structure area which is used to decrypt the data structure area, and where neither the user-provided password or the encryption key to the data structure area based upon the user-provided password are stored anyplace within the electronic device or anywhere else;
   a data structure interface module that, provided the data structure area has been successfully decrypted by the encryption key to the data structure area, generates random encryption keys for each file, encrypts each file, and stores the file encryption keys in the data structure area; and
   a file storage interface module, wherein the data structure interface module passes the encrypted files to the file storage interface module, the file storage interface module stores files received from the data structure interface module in the file storage area and retrieves files from the file storage area and passes them to the data structure interface module, the data structure interface module only being able to provide or accept such files after the data structure area has been successfully decrypted with the data structure area encryption key.

2. The electronic device as in claim 1 further comprising a tracking module that erases the data structure area and all content within it when a number of incorrectly entered passwords exceeds a predetermined threshold value.

3. The electronic device as in claim 1 further comprising a data structure area that is encrypted using AES-256.

4. The electronic device as in claim 1 wherein the file storage area further comprises an AES-256 encrypted database.

5. The electronic device as in claim 1 wherein the password further comprises at least eight characters including at least two non-alphanumeric characters.

6. The electronic device as in claim 1 further comprising a communication module that downloads files from a remote server.

7. An electronic device comprising:
   a hardware processor;
   a memory;
   an encrypted data structure area associated with a user that contains individual file encryption keys;
   a file storage area that stores files associated with a user on the electronic device, each file encrypted using a unique random encryption key that is stored in the encrypted data structure area;
   a user interface module that receives a password from the user of the electronic device, the received password is used to derive an encryption key where the encryption key is used to decrypt the data structure area and where neither the user-provided password or the encryption key to the data structure area based upon the user-provided password are stored anyplace within the electronic device or anywhere else;
   an encryption key processor that forms the data structure area encryption key from a combination of the password, a hard coded private string and a serial number of the electronic device;
   a data structure interface module that, provided the data structure area has been successfully decrypted by the data structure area encryption key, generates random encryption keys for each file, encrypts each file, and stores the file encryption keys in the data structure area; and a file storage interface module, wherein the data structure interface module passes the encrypted files to the file storage interface module, the file storage interface module stores files received from the data structure interface module in the file storage area and retrieves files from the file storage area and passes them to the data structure interface module, the data structure interface module only being able to provide or accept such files after the data structure area has been successfully decrypted with the data structure area encryption key.

8. The electronic device as in claim 7 further comprising a tracking module that erases the data structure area and all content within it when a number of incorrectly entered passwords exceeds a predetermined threshold value.

9. The electronic device as in claim 7 further comprising a data structure area that is encrypted using AES-256.

10. The electronic device as in claim 7 wherein the file storage area further comprises an AES-256 encrypted database.

11. The electronic device as in claim 7 further comprising a password processor that authenticates a user communicating through a remote server.

12. A non-transitory computer readable medium of an electronic device having an encrypted data structure area associated with a user on the electronic device that contains individual file encryption keys, a file storage area of a memory that stores files associated with a user on the electronic device, each file encrypted using a unique random encryption key that is stored in the encrypted data structure area, a data structure interface module and a file storage interface module, the non-transitory computer readable medium having a computer program executing on a hardware processor of the device to perform a set of steps comprising:

receiving a password from the user of the electronic device;

forming an encryption key from a combination of the user-provided password, a hard coded private string and a serial number of the electronic device;

unlocking the encrypted data structure area using the encryption key;

upon the successful unlocking of the encrypted data structure area, the data structure interface module generating random encryption keys for each file, encrypting each file, and storing the random file encryption keys in the data structure area; and the data structure interface module passing the encrypted files to the file storage interface module, the file storage interface module storing the files received from the data structure interface module in the file storage area and retrieving files from the file storage area and passing them to the data structure interface module, the data structure interface module retrieving a corresponding randomly generated key and decrypting the received file, the data structure interface module only being able to provide or accept such files after the data structure area has been successfully decrypted with the data structure area encryption key.

13. The non-transitory computer readable medium as in claim 12 further comprising erasing the data structure area and all content within it when a number of incorrectly entered passwords exceeds a predetermined threshold value.

14. The non-transitory computer readable medium as in claim 12 further comprising a data structure area that is encrypted using AES-256.

15. The non-transitory computer readable medium as in claim 12 wherein the file storage area further comprises an AES-256 encrypted database.

16. The non-transitory computer readable medium as in claim 12 wherein the password further comprises at least eight characters including at least two non-alphanumeric characters.

17. The non-transitory computer readable medium as in claim 12 further comprising downloading files from a remote user to the file storage area through the data security system.

* * * * *